United States Patent
Mizuura

(10) Patent No.: US 8,972,889 B2
(45) Date of Patent: Mar. 3, 2015

(54) DISPLAY PROCESSING APPARATUS AND DISPLAY PROCESSING METHOD

(75) Inventor: Yasuyuki Mizuura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1061 days.

(21) Appl. No.: 13/022,453

(22) Filed: Feb. 7, 2011

(65) Prior Publication Data

US 2011/0307827 A1 Dec. 15, 2011

(30) Foreign Application Priority Data

Jun. 9, 2010 (JP) ................................ 2010-132099

(51) Int. Cl.
*G06F 3/048* (2013.01)
*G06F 3/0488* (2013.01)

(52) U.S. Cl.
CPC ...... *G06F 3/04883* (2013.01); *G09G 2340/045* (2013.01); *G06F 2203/04805* (2013.01); *G06F 2203/04806* (2013.01); *G06F 2203/04808* (2013.01)
USPC ........................................................ 715/800

(58) Field of Classification Search
CPC .......................................................... G06F 3/14
USPC ........................................................ 715/800
See application file for complete search history.

(56) References Cited

U.S. PATENT DOCUMENTS

| 8,174,504 | B2 | 5/2012 | Arthur et al. | |
|---|---|---|---|---|
| 2004/0196267 | A1 | 10/2004 | Kawai et al. | |
| 2004/0263484 | A1* | 12/2004 | Mantysalo et al. | 345/173 |
| 2009/0267907 | A1 | 10/2009 | Noma | |
| 2010/0058254 | A1 | 3/2010 | Narita | |
| 2010/0097332 | A1 | 4/2010 | Arthur et al. | |
| 2011/0012928 | A1* | 1/2011 | Cholewin et al. | 345/661 |
| 2011/0109581 | A1* | 5/2011 | Ozawa et al. | 345/173 |

FOREIGN PATENT DOCUMENTS

| JP | H 08137620 | 5/1996 |
|---|---|---|
| JP | 2001290585 | 10/2001 |
| JP | 2004280745 | 10/2004 |

(Continued)

OTHER PUBLICATIONS

Japanese Patent Application No. 2010-132099, Notification of Reasons for Refusal, mailed May 10, 2011, (with English Translation).

(Continued)

*Primary Examiner* — Boris Pesin
*Assistant Examiner* — Angie Badawi
(74) *Attorney, Agent, or Firm* — Blakely, Sokoloff, Taylor & Zafman LLP

(57) ABSTRACT

According to one embodiment, there is provided a display processing apparatus, including: a display unit configured to display an image, the display unit having a screen on which the image is displayed; an input module configured to receive a first manipulation and a second manipulation, the first manipulation being a trace manipulation performed on the screen to define a tracing locus on the image being displayed, the second manipulation being different from the first manipulation; and a display controller configured to control the display unit to enlargedly display the image in a given range, upon simultaneously receiving the first manipulation and the second manipulation through the input module, the given range being determined based on the tracing locus.

6 Claims, 10 Drawing Sheets

(56) References Cited

FOREIGN PATENT DOCUMENTS

| JP | 2004-310219 | 11/2004 |
| JP | 2006331210 | 12/2006 |
| JP | 2009169493 | 7/2009 |
| JP | 2009266127 | 11/2009 |
| JP | 2010055511 | 3/2010 |
| WO | WO 2010047945 | 4/2010 |

OTHER PUBLICATIONS

Japanese Patent Application No. 2010-132099, Final Rejection, mailed Sep. 27, 2011, (with English Translation).
Japanese Patent Application No. 2011-277822, Notification of Reasons for Refusal, mailed Jan. 24, 2012, (with English Translation).
Japanese Patent Application No. 2011-277822, Notification of Reasons for Refusal, mailed Apr. 17, 2012, (with English Translation).

* cited by examiner

DISPLAY PROCESSING APPARATUS AND DISPLAY PROCESSING METHOD

CROSS-REFERENCE TO RELATED APPLICATION(S)

This application is based upon and claims the benefit of priority from Japanese Patent Application No. 2010-132099, filed on Jun. 9, 2010, the entire contents of which are incorporated herein by reference.

FIELD

Embodiments described herein relate generally to a display processing apparatus and a display processing method.

BACKGROUND

When an image (such as icons, video and a text) displayed on a display apparatus (such as an LCD) is too small, the user may wish to enlarge the image (see, for example, JP-2004-310219-A).

In conventional display processing apparatus, a manipulation for specifying a range of an image to be enlarged is difficult for the user.

BRIEF DESCRIPTION OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

In general, according to one embodiment, there is provided a display processing apparatus, including: a display unit configured to display an image, the display unit having a screen on which the image is displayed; an input module configured receive a first manipulation and a second manipulation, the first manipulation being a trace manipulation performed on the screen to define a tracing locus on the image being displayed, the second manipulation being different from the first manipulation; and a display controller configured to control the display unit to enlargedly display the image in a given range, upon simultaneously receiving the first manipulation and the second manipulation through the input module, the given range being determined based on the tracing locus.

(First Embodiment)

Figure 1:
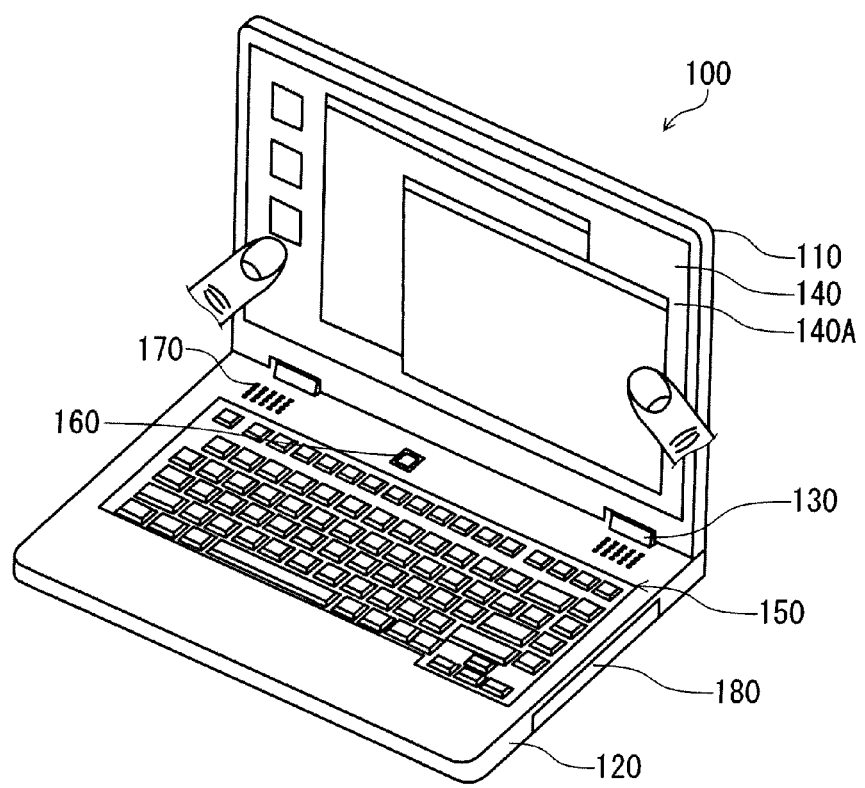
FIG. 1 illustrates an example computer according to a first embodiment.

A first embodiment will be hereinafter described with reference to the drawings. FIG. 1 illustrates a battery-drivable computer 100, as an example of a display processing apparatus according to the first embodiment.

The computer 100 has a display unit 110 and a main body unit 120, and in FIG. 1, the display unit 110 is opened. The display unit 110 is connected to the main body unit 120 by hinges 130. The display unit 110 has a display device (LCD) 140 and a touch screen 140A. The main body unit 120 has a keyboard 150, a power button 160, speakers 170 and an ODD 180.

The display unit 110 has a thin box-shaped cabinet, and a bottom portion of the display unit 110 is attached rotatably to the main body unit 120 by the hinges 130.

The LCD 140 and the touch screen 140A which is provided on the top surface of the LCD 140 constitute a touch screen display. When a touch is made with a pen or a finger, the touch screen display detects a touch area (touch position) in a displayed image. The touch screen 140A is of the resistive film type, the capacitance type, or the like.

The LCD 140 is capable of displaying various application windows, for example.

The main body unit 120 has a thin box-shaped cabinet. The keyboard 150 is provided in the main body unit 120 as a manipulation input device, and configured to receive a manipulation input from the user. The power button 160 is disposed in the rear of the keyboard 150. The speakers 170 are configured to output a sound. The ODD 180 is configured to write/read data to/from an optical disc such as a DVD.

The computer 100 according to the embodiment can enlarge part of an image displayed on the LCD 140 upon receiving the user's manipulation input through the touch screen 140A. Details will be described later with reference to FIGS. 2-8.

Figure 2:
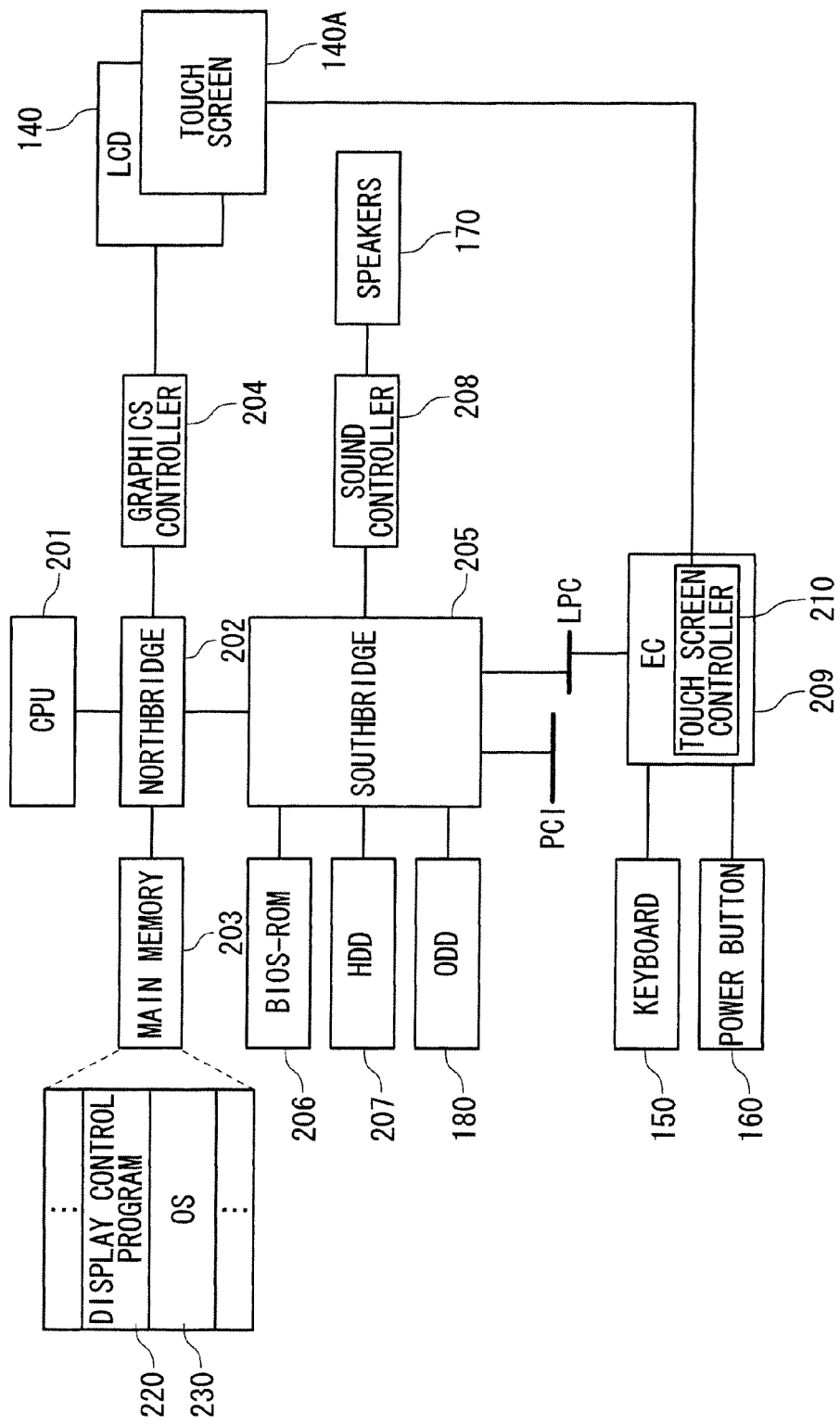
FIG. 2 illustrates an example system configuration of the computer according to the first embodiment.

Next, an example system configuration of the computer 100 will be described with reference to FIG. 2.

The computer 100 has a CPU 201, a northbridge 202, a main memory 203, a graphics controller 204, a southbridge 205, a BIOS-ROM 206, a hard disk drive (HDD) 207, a sound controller 208, an embedded controller (EC) 209, etc.

The CPU 10 controls operations of the computer 100, and runs various programs such as a display control program 220 and an operating system (OS) 230 when they are read into the main memory 203 from the HDD 207.

The CPU 201 is also capable of running a system BIOS (basic input/output system) which is a program for controlling the hardware of the computer 100 and is stored in the BIOS-ROM 206.

The northbridge 202 is a bridge device for connecting a local bus of the CPU 201 to the south bridge 205. A memory controller for access-controlling the main memory 203 is built in the northbridge 202.

Into the main memory 203, the OS 230 and any of various application programs to be run by the CPU 201 are read. Programs such as the display control program 220 and the OS 230 are read into the main memory 203 from the HDD 207.

The graphics controller 204 controls the LCD 140 which is used as a display device of the computer 100. The graphics controller 204 performs display processing (graphics computation) for drawing display data in a video memory (VRAM) according to a drawing request that is input from the CPU 201 via the northbridge 202.

The southbridge 205 incorporates an IDE (integrated drive electronics) controller for controlling the HDD 207 and a serial ATA controller.

The embedded controller (EC) 209 is capable of powering on or off the computer 100 upon the user's manipulation of the power button 160. The embedded controller 209 incorporates a touch screen controller 210 for controlling the touch screen 140A which is attached to the LCD 140 and a keyboard controller (not shown) for controlling the keyboard 150.

Figure 3:
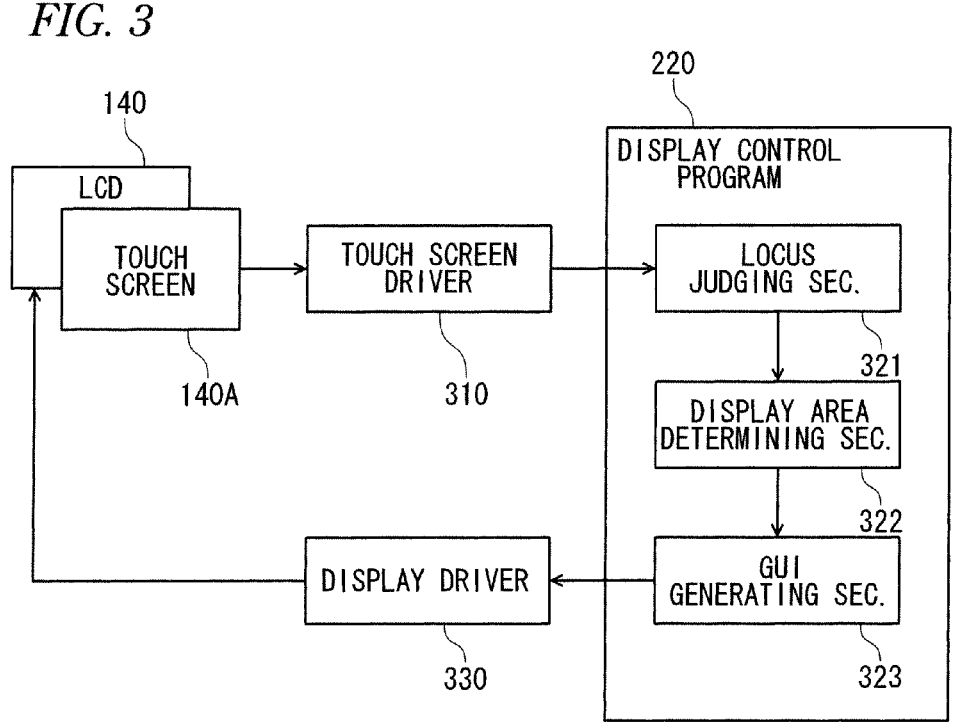
FIG. 3 illustrates a functional block diagram of a display control program according to the first embodiment.

Next, the functional blocks of the display control program 220 will be described with reference to FIG. 3.

The display control program 220 has a locus judging section 321, a display area determining section 322, a GUI generating section 323, etc. The display control program 220 receive data corresponding to a manipulation on the touch screen 140A from a touch screen driver 310 and causes a display driver 410 to display an image on the LCD 140. The touch screen driver 310 receives manipulation input data from the touch screen 140A via the touch screen controller 210. The display driver 330 outputs image data to the LCD 140 via the graphics controller 204.

When a touch area of a touch manipulation on the touch screen 140A has been moved without an external member's coming out of contact with the touch screen 140A (the external member is a finger of the user, a pen, or the like), that is, when a trace manipulation has been made on the touch screen 140A, the locus judging section 321 detects and stores a tracing locus of the trace manipulation and judges a shape etc. of the locus.

When the touch screen 140A has received a touch manipulation input and detected its touch area, the locus judging section 321 receives touch area detection information from the touch screen driver 310. The touch area detection information includes coordinate data indicating the touch area (touch position), on the touch screen 140A, of the touch made with an external member.

The locus judging section 321 judges the number of touch areas detected by the touch screen driver 310 based on the touch area detection information that is input from the touch screen driver 310, and judges whether or not the touch screen 140A is receiving touch manipulations at two positions.

If judging that the touch screen 140A is receiving touch manipulations at two positions, the locus judging section 321 detects movements of the touch areas of the two touch manipulations being made on the touch screen 140A at the two positions. If one of the two touch manipulations turns to a trace manipulation whereas the other touch manipulation remains as it is, the locus judging section 321 stores sets of coordinates (positions) of a tracing locus of the trace manipulation.

For example, if at least one of the stationary touch manipulation and the trace manipulation is finished due to the external member's coming out of contact with the touch screen 140A, the locus judging section 321 judges whether or not the tracing locus of the trace manipulation is a closed curve (need not be closed exactly) such as a circle, an ellipse, or a polygon that surrounds an arbitrary point on the touch screen 140A. If the tracing locus is a closed curve surrounding an arbitrary point, the locus judging section 321 judges whether the tracing movement is clockwise or counterclockwise. Processing of judging whether or not the tracing locus is a closed curve surrounding an arbitrary point will be described later with reference to FIG. 6. If judging that the tracing movement is clockwise, the locus judging section 321 outputs information of the tracing locus to the display area determining section 322. If judging that the tracing movement is counterclockwise, the locus judging section 321 outputs an enlargement display cancellation notice to the display area determining section 322.

When receiving the locus information from the locus judging section 321, the display area determining section 322 determines a range of an image for an enlargement display according to the position of the locus and outputs information of the determined display range to the GUI generating section 323. A relationship between a locus position and a display range will be described later with reference to FIGS. 7A-7C. When receiving the enlargement display cancellation notice from the locus judging section 321, the display area determining section 322 instructs the GUI generating section 323 to cancel enlargement display.

When receiving the display range information or the enlargement display cancellation instruction from the display area determining section 322, the GUI generating section 323 generates image data based on the received display range information or enlargement display cancellation instruction and outputs the generated image data to the display driver 330. The display driver 330 displays video corresponding to the received image data on the LCD 140.

Next, an example enlargement display operation which is performed by the computer 100 according to the embodiment will be described with reference to FIGS. 4A and 4B.

Figure 4A:
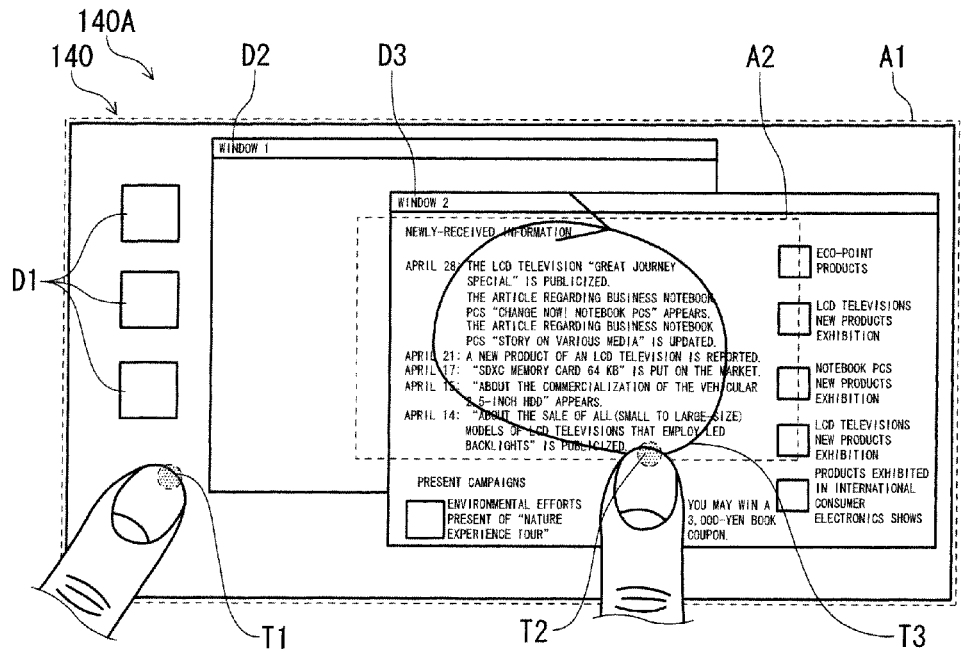
FIGS. 4A and 4B illustrate an example enlargement display operation according to the first embodiment.
Figure 4B:
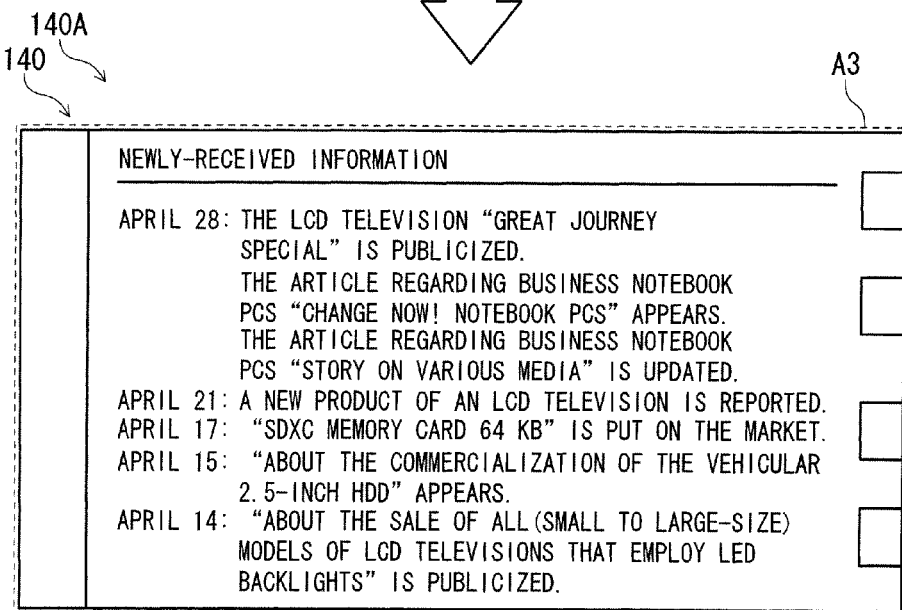

FIG. 4A shows an example picture which is displayed on the LCD 140 of the computer 100. As shown in FIG. 4A, the picture A1 which is displayed on the LCD 140 includes icons D1, application windows D2 and D3, etc.

If the touch screen 140A receives touch manipulations at areas T1 and T2 on the touch screen 140A, the locus judging section 321 starts detection of tracing movements. If the touch manipulation at the area T2 turns to a trace manipulation to draw a locus T3 whereas the touch manipulation at the area T1 remains as it is, that is, the finger does not come out of contact with the touch screen 140A and makes no movement, the locus judging section 321 stores sets of coordinates (positions), on the touch screen 140A, of the locus T3 of the trace manipulation.

For example, if at least one of the two touch manipulations at the area T1 and the trace manipulation having the locus T3 is finished due to the finger's coming out of contact with the touch screen 140A, the locus judging section 321 judges whether or not the locus T3 of the trace manipulation is a closed curve surrounding an arbitrary point such as a circle, an ellipse, or a polygon.

If the locus T3 of the trace manipulation is a closed curve surrounding an arbitrary point, the locus judging section 321 judges whether the trace manipulation is clockwise or counterclockwise. If judging that the trace manipulation is clockwise, the locus judging section 321 outputs information of the locus T3 of the trace manipulation to the display area determining section 322.

When receiving the locus information from the locus judging section 321, the display area determining section 322 determines a range of the image for the enlargement display according to the position, on the touch screen 140A, of the locus T3 of the trace manipulation. That is, for example, the display area determining section 322 determines, as a range of an image to be displayed on the LCD 140, a range A2 that has the same aspect ratio as the LCD 140 and corresponds to the position of the locus T3 (see FIG. 4A). The details of the manner of determination of a display range will be described later with reference to FIGS. 7A-7C.

Then, the display area determining section 322 outputs information of the determined display range to the GUI generating section 323. The GUI generating section 323 causes the display driver 330 to display an enlarged image A3 as shown in FIG. 4B on the LCD 140. That is, the computer 100 receives touch manipulations at areas T1 and T2. If the touch manipulation at the area T2 is a trace manipulation which specifies a range A2 of the picture A1 by a clockwise movement having a generally circular locus T3, an image in the range A2 is enlargedly displayed on the LCD 140. In this manner, the image that occupies the range A2, corresponding to the position of the user's touch manipulation, in the picture A1 can be displayed on the LCD 140 at a higher resolution than in the picture A1.

Next, an example reduction display operation which is performed by the computer 100 according to the embodiment will be described with reference to FIGS. 5A and 5B.

Figure 5A:
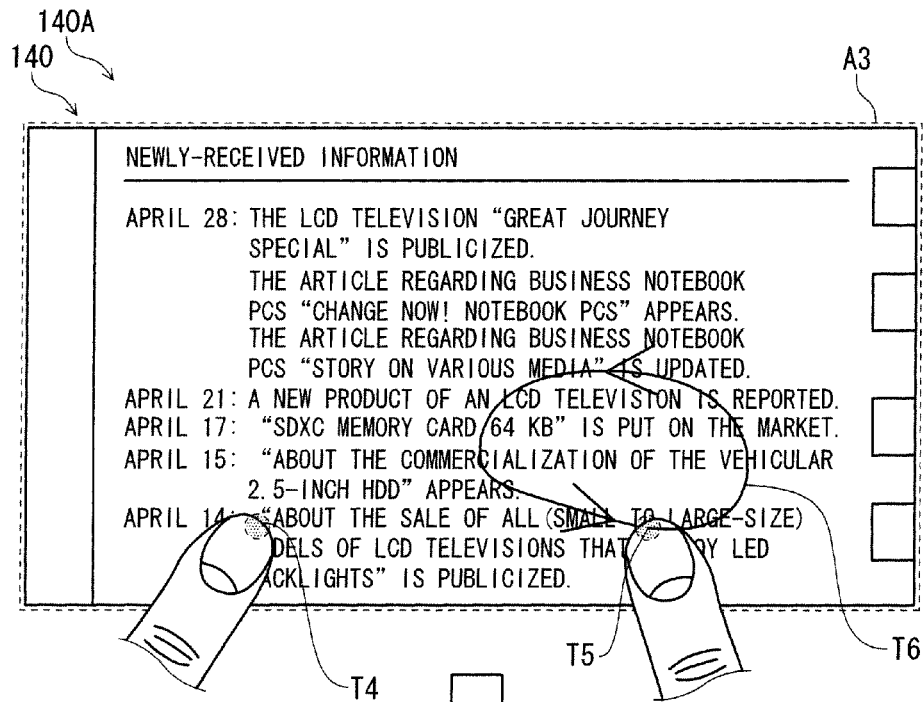
FIGS. 5A and 5B illustrate an example reduction display operation according to the first embodiment.
Figure 5B:
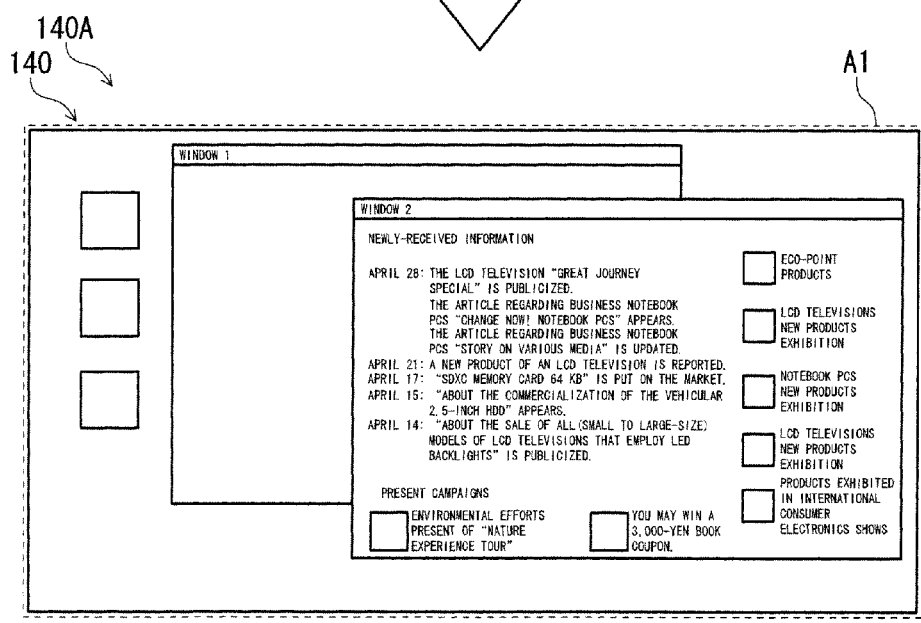

FIG. 5A shows an example enlarged picture which is displayed on the LCD 140 of the computer 100. If the touch screen 140A receives touch manipulations at two areas 14 and T5 on the touch screen 140A, the locus judging section 321 starts detection of movements the touch areas of the touch manipulations.

If the touch manipulation at the area T5 turns to a trace manipulation to draw a locus T6 whereas the touch manipulation at the area T4 remains as it is, that is, the finger does not come out of contact with the touch screen 140A and makes no movement, the locus judging section 321 stores pieces of position information of the locus T6 of the trace manipulation. For example, if the touch manipulation at the area T4 or the trace manipulation having the locus T6 is finished due to the finger's coming out of contact with the touch screen 140A, the locus judging section 321 judges whether or not the locus T6 of the trace manipulation is a closed curve surrounding an arbitrary point and whether the trace manipulation is clockwise or counterclockwise. If judging that the trace manipulation is counterclockwise, the locus judging section 321 outputs an enlargement display cancellation notice to the display area determining section 322.

When receiving the enlargement display cancellation notice from the locus judging section 321, the display area determining section 322 determines, as an image to be displayed on the LCD 140, an image that has the same contents as and is lower in resolution than the image being displayed in the picture A3 and output information of the determined image to the GUI generating section 323. The GUI generating section 323 causes the display driver 330 to display an image as shown in FIG. 5B on the LCD 140.

Figure 6:
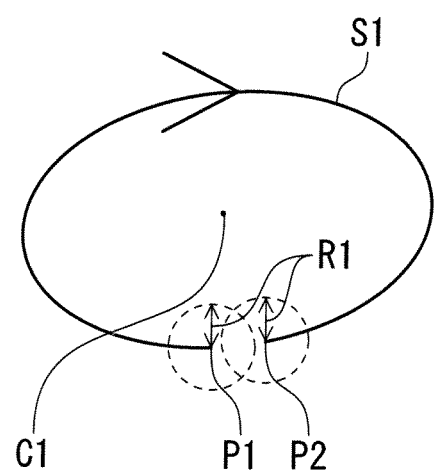
FIG. 6 illustrates judgment processing for area specification according to the first embodiment.

Next, processing of judging a shape of a tracing locus will be described with reference to FIG. 6. FIG. 6 shows an example locus to be judged as a closed curve surrounding an arbitrary point.

If a locus S1 of a trace manipulation from point P1 to point P2 is located around point C1 and a circle having a radius R1 and having the start point P1 as the center overlaps with a circle having the radius R1 and having the end point P2 as the center, the locus judging section 321 judges that the locus S1 is a closed curve surrounding point C1. That is, the locus judging section 321 judges that a tracing locus of the trace manipulation is a closed curve surrounding an arbitrary point on the touch screen 140A if it surrounds the arbitrary point and the distance between its start point and end point is within a predetermined value even if the start point and the end point do not exactly coincide with each other.

While the judgment processing on the clockwise locus S1 is described above, the locus judging section 321 performs similar judgment processing on a counterclockwise locus.

Figure 7A:
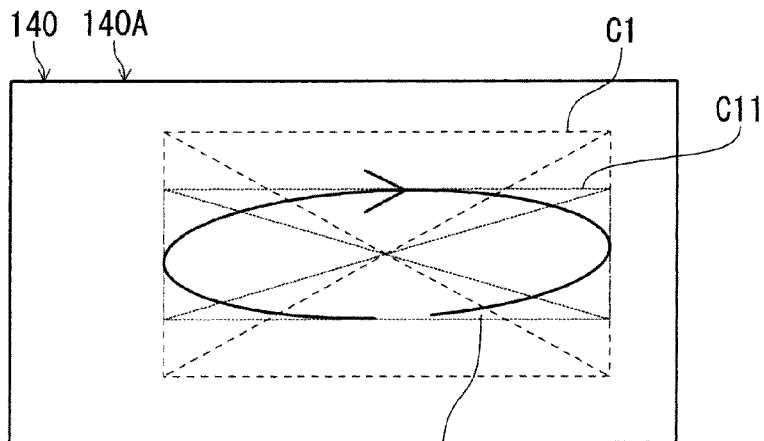
FIGS. 7A-7C illustrate example processings for display area determination according to the first embodiment.
Figure 7B:
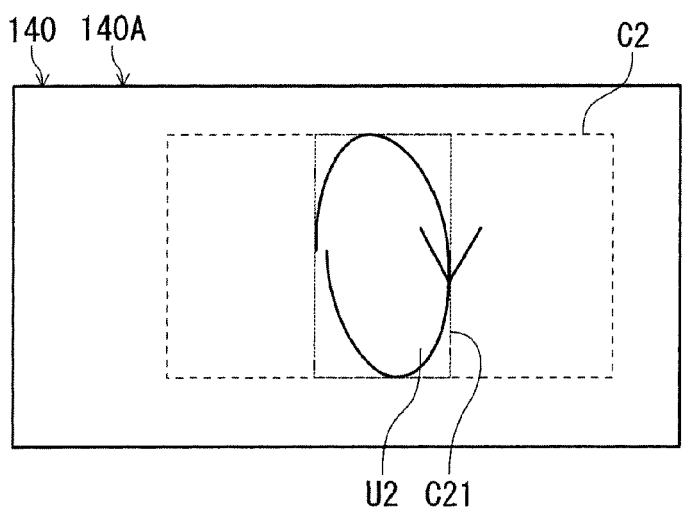
Figure 7C:
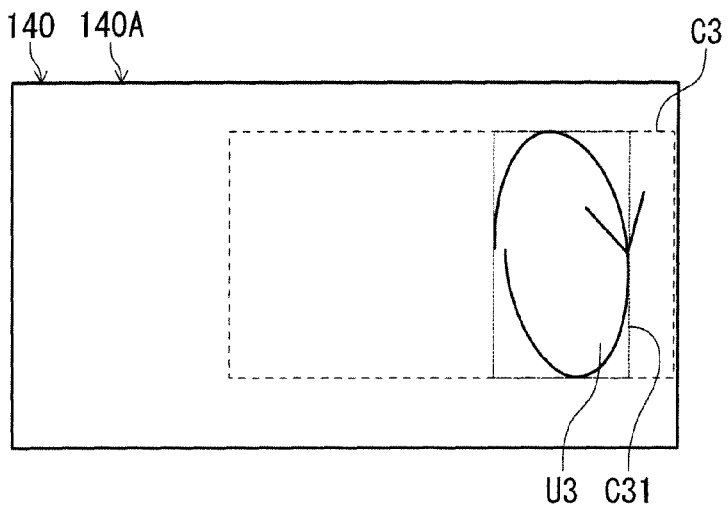

Next, example processings for display area determination to display an enlarged will be described with reference to FIGS. 7A-7C. FIGS. 7A-7C shows ranges of images to be displayed on the LCD 140 which are determined by the display area determining section 322.

If a tracing locus is a closed curve surrounding an arbitrary point, the display area determining section 322 determines a portion of an image displayed on the LCD 140 as a target of the enlargement display, based on the position and the size of the locus. Specifically, the size of the target image is determined correspondingly with at least one of the vertical length and the horizontal length of a range of the locus.

In an example of FIG. 7A, the range of a tracing locus is larger in aspect ratio (horizontal-to-vertical ratio) than the screen of the LCD 140. As shown in FIG. 7A, the display area determining section 322 determines a target image for the enlargement display in a rectangular range C1 that has the same aspect ratio as the screen of the LCD 140 and whose right end line and left end line pass the right end and the left end of a locus U1, respectively.

The display area determining section 322 determines a range for enlargement display with the range of the locus U1 as a center. That is, the display area determining section 322 determines the range C1 for enlargement display so that a rectangular range C11 that is tangent to the locus U1 at its top end, bottom end, the right end, and the left end is located at the center of the range C1. The term "the range C11 is located at the center of the range C1" means that, for example, the intersecting point of the diagonals of the range C1 coincides with that of the range C11.

In an example of FIG. 7B, the range of a tracing locus is smaller in aspect ratio than the screen of the LCD 140. The display area determining section 322 determines a target image for the enlargement display in a rectangular range C2 that has the same aspect ratio as the screen of the LCD 140 and whose top end line and bottom end line pass the top end and the bottom end of a locus U2, respectively. The display area determining section 322 determines the range C2 so that a range C21 of the locus U2 is located at the center of the range C2.

In an example of FIG. 7C, the range of a tracing locus is close to an end line of the screen of the LCD 140. Since a locus U3 is long in the vertical direction, the display area determining section 322 determines a target image for the enlargement display in a rectangular range C3 that has the same aspect ratio as the screen of the LCD 140 and whose top end line and bottom end line pass the top end and the bottom end of the locus U3, respectively. However, since the right end line of a range C31 of the locus U3 is close to the right end line of the screen of the LCD 140, the display area determining section 322 determines the range C3 so that its right end line coincides with the right end line of the screen of the LCD 140.

In the above description made with reference to FIGS. 7A-7C, the display area determining section 322 determines a range for enlargement display so that its top end line and bottom end line or its right end line and left end line pass the top end and bottom end or the right end and left end of a tracing locus. However, the former need not always pass the latter. For example, there may be a certain distance between the top end line and bottom end line or the right end line and left end line of the range for enlargement display and the top end and bottom end or the right end and left end of the tracing locus. Further, the display area determining section 322 may determine a range for enlargement display so that it is inscribed in a tracing locus.

Next, an example display process which is executed by the computer 100 will be described with reference to FIG. 8.

First, upon receiving touch manipulations at two positions on the touch screen 140A (S801: yes) and judging that one of the two touch manipulations is stationary and the other is a trace manipulation (S802: yes), at step S803 the locus judging section 321 detects and stores a tracing locus of the trace manipulation.

If judging that at least one of the two touch manipulations has been finished because the external member has come out of contact with the touch screen 140A (S804: yes), at step S805 the locus judging section 321 judges whether or not the locus of the trace manipulation is a closed curve based on stored locus information. If judging that the locus of the trace manipulation is a closed curve (S805: yes), at step S806 the locus judging section 321 judges whether the movement locus of the trace manipulation is clockwise or counterclockwise.

If judging that the movement locus is clockwise (S806: yes), at step S807 the display area determining section 322 determines, as an image to be displayed on the LCD 140, an image in a range that corresponds to the range of the locus of the trace manipulation. At step S808, the display area determining section 322 outputs information of the determined range to the GUI generating section 323 and the GUI generating section 323 causes the display driver 330 to enlargedly display, on the LCD 140, the image in the range indicated by the received information.

On the other hand, if the trace manipulation is counterclockwise (S806: no) and the image being displayed on the LCD 140 is an enlarged image (S809: yes), at step S810 the display area determining section 322 instructs the GUI generating section 323 to generate image data for non-enlargement display and the GUI generating section 323 causes the display driver 330 to display a non-enlarged image on the LCD 140.

Figure 8:
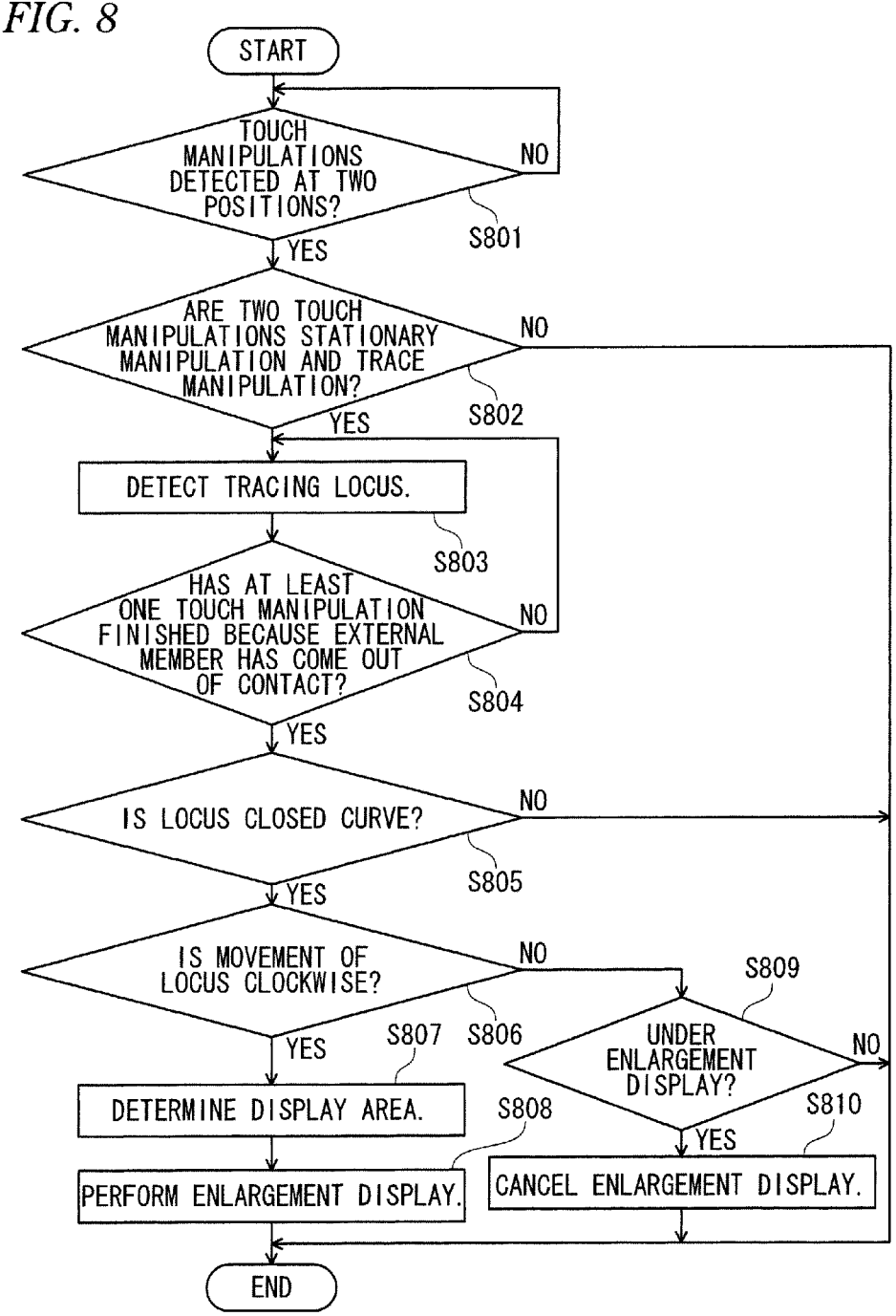
FIG. 8 illustrates an example display process according to the first embodiment.

At steps S804 and S805 of the example display process of FIG. 8, the locus judging section 321 judges whether or not the locus of a trace manipulation has formed a closed curve after at least one touch manipulation on the touch screen 140A is finished. For example, if the trace manipulation has formed a closed curve during detection of the movement locus of the trace manipulation at step S803, step S806 may be executed even if neither of the touch manipulations has been finished.

According to the first embodiment, the computer 100 can receive an enlargement range specifying manipulation from the user when touch manipulations have been made on the touch screen 140A at two positions. As a result, the computer 100 can judge whether or not a manipulation on the touch screen 140A is an enlargement range specifying manipulation. Furthermore, the user can perform an enlargement range specifying manipulation easily without turning his or her eyes away from the LCD 140.

(Second Embodiment)

Figure 9:
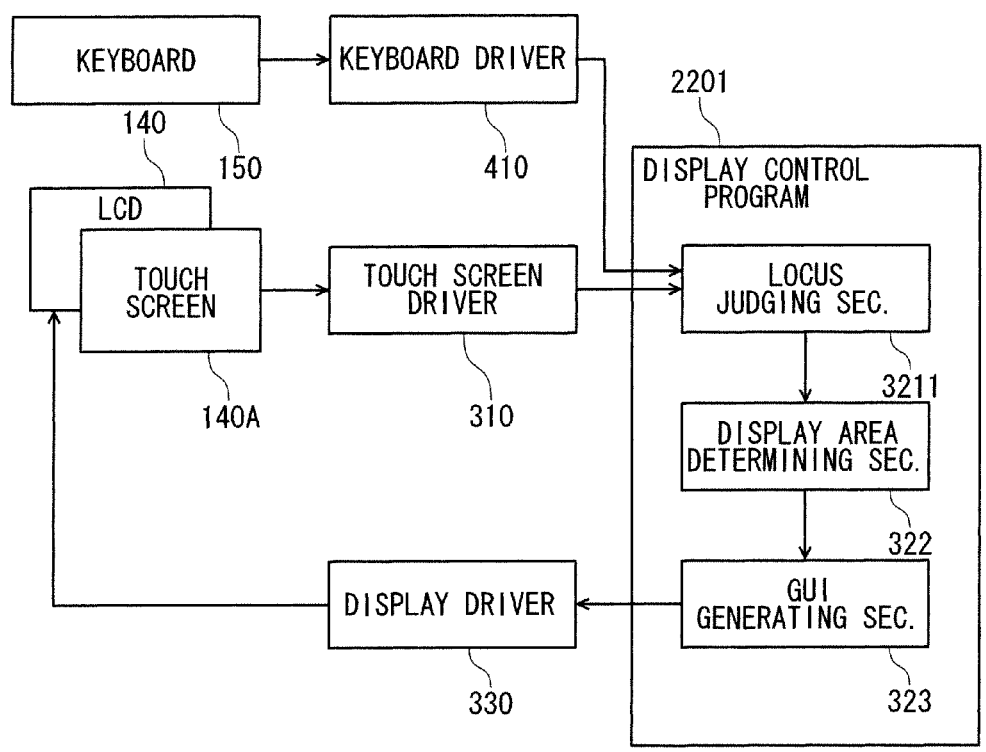
FIG. 9 illustrates a functional block diagram of a display control program according to a second embodiment.

Next, a second embodiment will be described with reference to FIGS. 9 and 10. Whereas the computer 100 according to the first embodiment detects a tracing movement and performs display enlargement/reduction processing when receiving touch manipulations on the touch screen 140A at two positions, a computer 100 according to the second embodiment detects a tracing movement and performs display enlargement/reduction processing when both of the keyboard 150 and the touch screen 140A have been manipulated. The system configuration of the computer 100 according to the second embodiment is the same as that of the computer 100 according to the first embodiment and hence will not be described below.

First, the functions of a display control program 2201 according to the second embodiment will be described with reference to FIG. 9. In FIG. 9, the LCD 140, the touch screen 140A, the touch screen driver 310, the display area determining section 322, the GUI generating section 323, and the display driver 330 operate in the same manner as in the first embodiment. Only sections and units having different functions than in the first embodiment will mainly be described below.

A locus judging section 3211 receives touch area detection information from the touch screen driver 310 when the touch screen 140A has received a touch manipulation, and receives a key code corresponding to the manipulated key from a keyboard driver 410 when the keyboard 150 has received a manipulation input.

Then, the locus judging section 3211 judges whether or not both of the touch screen 140A and the keyboard 150 have been manipulated based on the touch area detection information received from the touch screen driver 310 and the key code received from the keyboard driver 410.

If judging that both of the touch screen 140A and the keyboard 150 have been manipulated, the locus judging section 3211 attempts to detect a tracing movement on the touch screen 140A. If detecting a tracing movement, the locus judging section 3211 stores a tracing locus. The key to be manipulated of the keyboard 150 may be any key. However, it is preferable that, for example, the keyboard 150 receive a manipulation on one of the Shift key, Fn key, Ctrl key, and Alt key or manipulations on plural ones of these keys.

For example, when at least one of the manipulations on the touch screen 140A and the keyboard 150 has been finished, the locus judging section 3211 judges whether or not the tracing locus is a closed curve. If judging that the tracing locus is a closed curve, the locus judging section 3211 judges whether or not the locus is clockwise or counterclockwise. The processing of judging whether or not the tracing locus is a closed curve is the same as described above with reference to FIG. 6. If judging that the locus is clockwise, the locus judging section 3211 outputs pieces of position information of the locus to the display area determining section 322. If judging that the locus is counterclockwise, the locus judging section 3211 outputs an enlargement display cancellation notice to the display area determining section 322.

Then, when receiving the pieces of position information of the locus, the display area determining section 322 determines a display area in the manner described above with reference to FIGS. 7A-7C. When receiving the enlargement display cancellation notice, the display area determining section 322 decides to display a non-enlarged image and outputs information of an image to be displayed on the LCD 140 to the GUI generating section 323. The GUI generating section 323 generates image data according to the instruction from the display area determining section 322 and causes the display driver 330 to display an image of the generated image data on the LCD 140.

Next, an example display process which is executed by the computer 100 according to the second embodiment will be described with reference to FIG. 10.

First, if both of the touch screen 140A and the keyboard 150 have been manipulated (S901: yes), at step S902 the locus judging section 3211 detects and stores a tracing locus on the touch screen 140A.

If judging that at least one of the manipulations on the touch screen 140A and the keyboard 150 has been finished (S903: yes), at step S904 the locus judging section 3211 judges whether or not the tracing locus is a closed curve. If judging that the locus is a closed curve (S904: yes), at step S905 the locus judging section 3211 judges whether the movement locus is clockwise or counterclockwise.

If judging that the movement locus is clockwise (S905: yes), at step S906 the display area determining section 3221 determines, as an image to be displayed on the LCD 140, an image in a range that corresponds to the range of the locus. At step S907, the display area determining section 322 outputs information of the determined range to the GUI generating section 323 and the GUI generating section 323 causes the display driver 330 to enlargedly display an image on the LCD 140.

On the other hand, if the tracing locus is counterclockwise (S905: no) and the image being displayed on the LCD 140 is an enlarged image (S908: yes), at step S909 the display area determining section 322 instructs the GUI generating section 323 to generate image data for non-enlargement display and the GUI generating section 323 causes the display driver 330 to display a non-enlarged image on the LCD 140.

Figure 10:
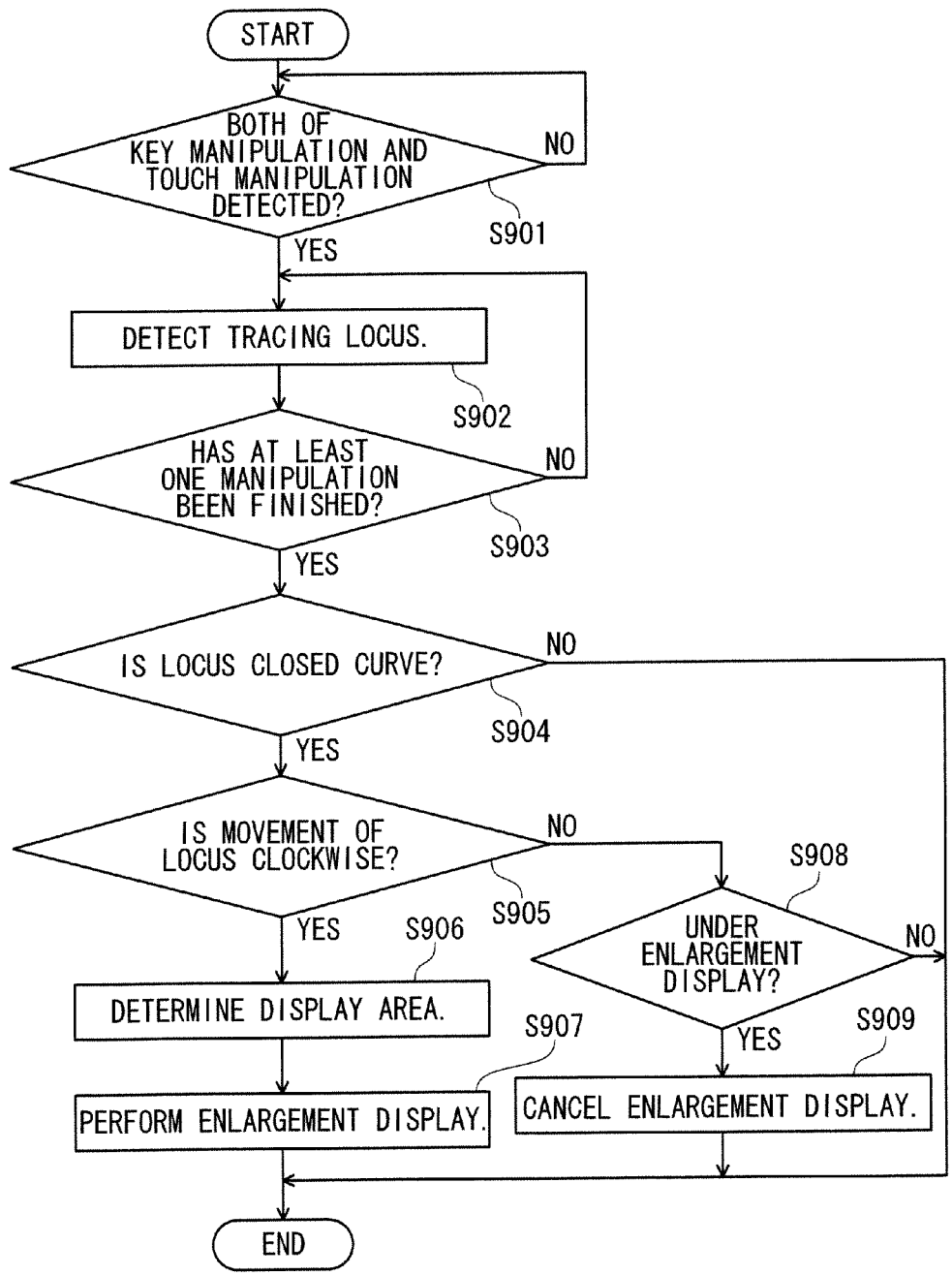
FIG. 10 illustrates an example display process according to the second embodiment.

At steps S903 and S904 of the example display process of FIG. 10, the locus judging section 3211 judges whether or not the locus has formed a closed curve after the touch manipulation on the touch screen 140A is finished. For example, if the tracing locus has formed a closed curve during detection of the tracing locus at step S902, step S905 may be executed even if the touch manipulation of step S902 has not been finished yet.

In the example display process of FIG. 10, the computer 100 performs enlargement display processing if the touch screen 140A receives a clockwise touch manipulation, and performs enlargement display cancellation processing (reduction display processing) if the touch screen 140A receives a counterclockwise touch manipulation. Alternatively, the computer 100 may perform enlargement display processing or reduction display processing depending on the manipulated key of the keyboard 150. For example, the computer 100 may perform enlargement display processing when receiving a Shift key manipulation and a closed curve touch manipulation, and perform enlargement display cancellation processing when receiving a Ctrl key manipulation and a closed curve touch manipulation.

According to the second embodiment, the computer 100 can receive an enlargement range specifying manipulation on the touch screen 140A from the user when both of the touch screen 140A and the keyboard 150 have been manipulated. As a result, the computer 100 can judge whether or not a manipulation on the touch screen 140A is an enlargement range specifying manipulation. Furthermore, switching between enlargement display processing and reduction display processing can be made depending on the manipulated key of the keyboard 150.

In each of the first and second embodiments, when receiving a touch manipulation for specifying part of an image displayed on the LCD 140 by a movement that forms a closed curve around it, the computer 100 can enlargedly display the part of the image. This allows the user to easily specify a range to be enraged and to have an enlarged image in the specified range.

The invention is not limited to the above embodiments themselves. Constituent elements may be modified without departing from the spirit and scope of the invention. For example, several ones of the constituent elements of each embodiment may be omitted, and constituent elements of different embodiments may be combined as appropriate.

What is claimed is:

1. A display processing apparatus, comprising:
a display unit configured to display an image, the display unit having a screen on which the image is displayed;
an input device configured to receive at least one of a first manipulation or a second manipulation, the first manipulation being a loop trace manipulation performed in a first rotational direction on the screen for defining a first range of the image, the second manipulation being a loop trace manipulation performed in a second rotational direction on the screen for defining a second range of the image, each of the first range and the second range having the same aspect ratio with the screen, wherein the first rotational direction is different from second rotational direction; and
a processing unit configured to
control, upon receiving the first manipulation, the display unit to display an enlarged display of the first range of the image, and
control, upon receiving the second manipulation, the display unit to display a reduced display of the image with respect to the second range,
wherein a tracing locus of the first manipulation has a vertical length and a horizontal length which correspond to a vertical side and horizontal side of a circumscribed rectangular of the tracing locus, and
wherein, upon receiving the first manipulation, the processing unit compares the vertical length and the horizontal length of the tracing locus to select the vertical length of the tracing locus or the horizontal length of the tracing locus, and defines the first range to have a horizontal side that coincides with the horizontal length of the tracing locus, or to have a vertical side that coincides with the vertical length of the tracing locus.

2. The apparatus of claim 1,
wherein the processing unit selects a longer one of the vertical length or the horizontal length of the tracing locus, and defines the first range to have the vertical side or the horizontal side that corresponds to the longer one of the vertical length or the horizontal length of the tracing locus.

3. The apparatus of claim 1,
wherein the input device is further configured to receive a third manipulation, the third manipulation being different from the first manipulation and from the second manipulation, and
the processing unit to control the display unit to display the enlarged display of the first range of the image upon simultaneously receiving the first manipulation and the third manipulation, and to control the display unit to display the reduced display of the image with respect to the second range upon simultaneously receiving the second manipulation and the third manipulation.

4. The apparatus of claim 3,
wherein the third manipulation includes a touch manipulation on the screen of the display unit.

5. The apparatus of claim 3,
wherein the third manipulation includes a manipulation on a keyboard.

6. A display processing method, the method comprising:
displaying an image on a screen of a display unit;
receiving by an input device at least one of a first manipulation or a second manipulation, the first manipulation being a loop trace manipulation performed in a first rotational direction on the screen for defining a first range of the image, the second manipulation being a loop trace manipulation performed in a second rotational direction on the screen for defining a second range of the image, each of the first range and the second range having the same aspect ratio within the screen, wherein the first rotational direction is different from second rotational direction, wherein a tracing locus of the first manipulation has a vertical length and a horizontal length which correspond to a vertical side and horizontal side of a circumscribed rectangular of the tracing locus;

displaying by a processing unit an enlarged display of the first range of the image upon receiving the first manipulation, wherein displaying the enlarged display of the first range of the image includes, upon receiving the first manipulation:
  comparing by the processing unit the vertical length and the horizontal length of the tracing locus to select the vertical length of the tracing locus or the horizontal length of the tracing locus, and
  defining by the processing unit the first range to have a horizontal side that coincides with the horizontal length of the tracing locus, or to have a vertical side that coincides with the vertical length of the tracing locus,
displaying by the processing unit a reduced display of the image with respect to the second range upon receiving the second manipulation.

* * * * *